United States Patent [19]

Stamboulian

[11] 4,285,478
[45] Aug. 25, 1981

[54] SEAT BELT RETRACTOR MECHANISM HOUSING

[75] Inventor: Nazareth Stamboulian, Los Angeles, Calif.

[73] Assignee: American Safety Equipment Corporation, San Fernando, Calif.

[21] Appl. No.: 55,181

[22] Filed: Jul. 6, 1979

[51] Int. Cl.³ .................... A62B 35/00; B65H 75/48
[52] U.S. Cl. ................................ 242/107; 29/453; 242/107.4 R; 185/45
[58] Field of Search .................. 242/107–107.7; 29/443, 451, 453; 403/288, 289, 280, 282; 248/221.4, 221.3; 185/45

[56] References Cited

U.S. PATENT DOCUMENTS

| | | | |
|---|---|---|---|
| 3,154,281 | 10/1964 | Frank | 248/221.4 X |
| 3,305,103 | 2/1967 | Hilstrom | 242/107.5 X |
| 3,605,231 | 9/1971 | Kistner et al. | 29/451 |
| 3,711,134 | 1/1973 | Goldberg | 29/453 X |
| 3,891,273 | 6/1975 | Takada | 242/107.4 R |
| 4,159,809 | 7/1979 | Rawson | 242/107 |

OTHER PUBLICATIONS

IBM Technical Disclosure Bulletin, vol. 19, No. 2, Jul. 1976.

Primary Examiner—John M. Jillions
Attorney, Agent, or Firm—Poms, Smith, Lande & Rose

[57] ABSTRACT

An improved housing is provided for a seat belt retractor mechanism. The retractor mechanism attaches to a seat belt retractor frame and has a belt rewind spring disposed therein which attaches at one end to a belt storage spool. The housing includes a housing body and a housing cap which rotatably abuts the body in covering relation and which engages the other end of the spring. The rotatable abutment is made possible by a plurality of socket members disposed along the outer periphery of the housing body and a plurality of resilient deformable locking flanges positioned upon the cap. The resilient flanges are formed on the cap in a manner creating a bias toward a position placing the locking fingers above the socket members when the cap is rotated relative to the body during the assembly process to tension the spring. When the spring has been sufficiently tensioned, the flanges are aligned with the sockets and deformed to an extent causing locking fingers on the flanges to latchingly engage the sockets. The combination of the latching engagement and the inherent bias in the flanges tightly affixes the cap to the body.

9 Claims, 11 Drawing Figures

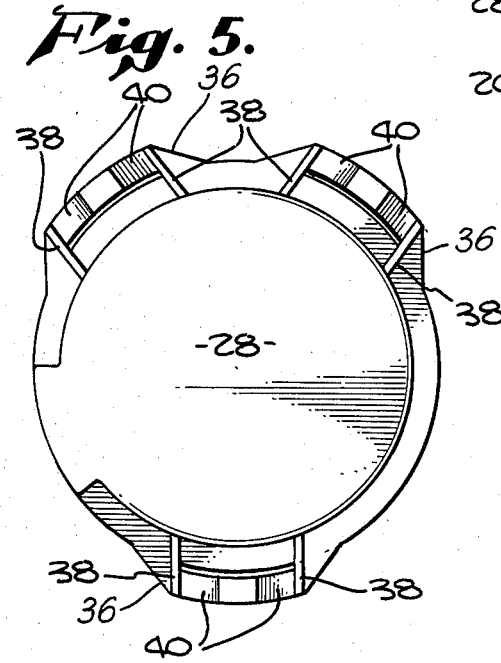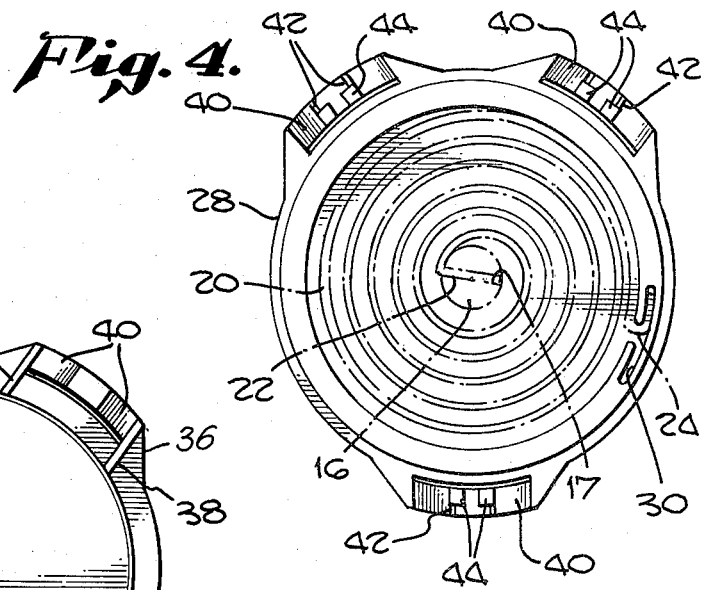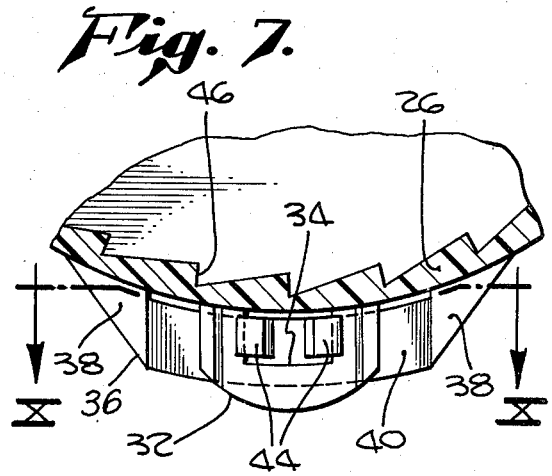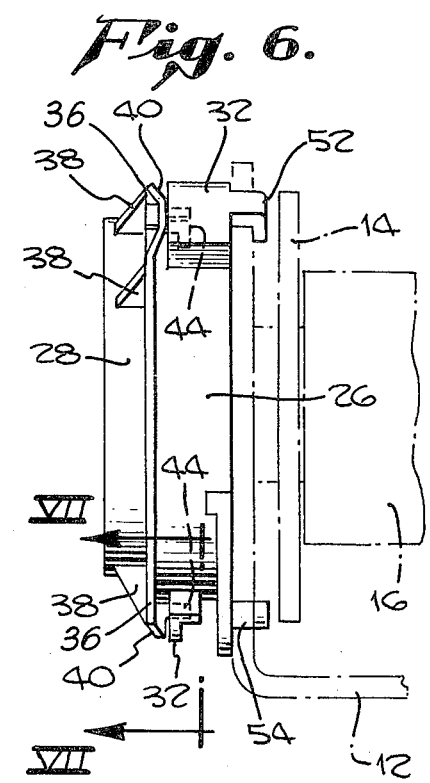

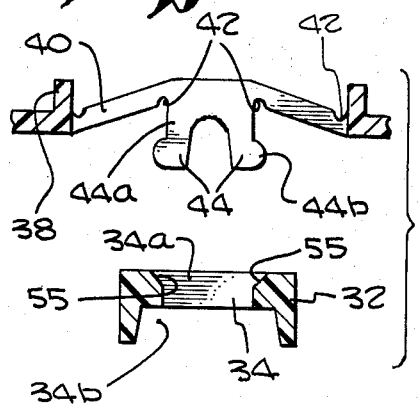
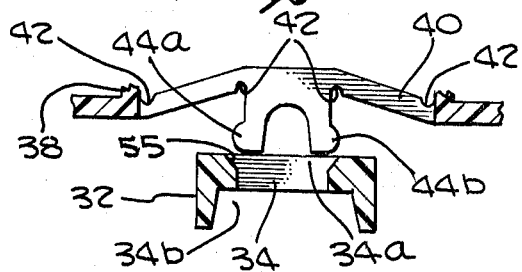
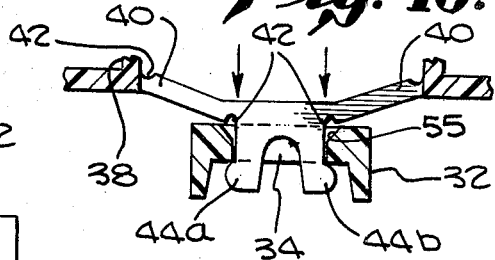
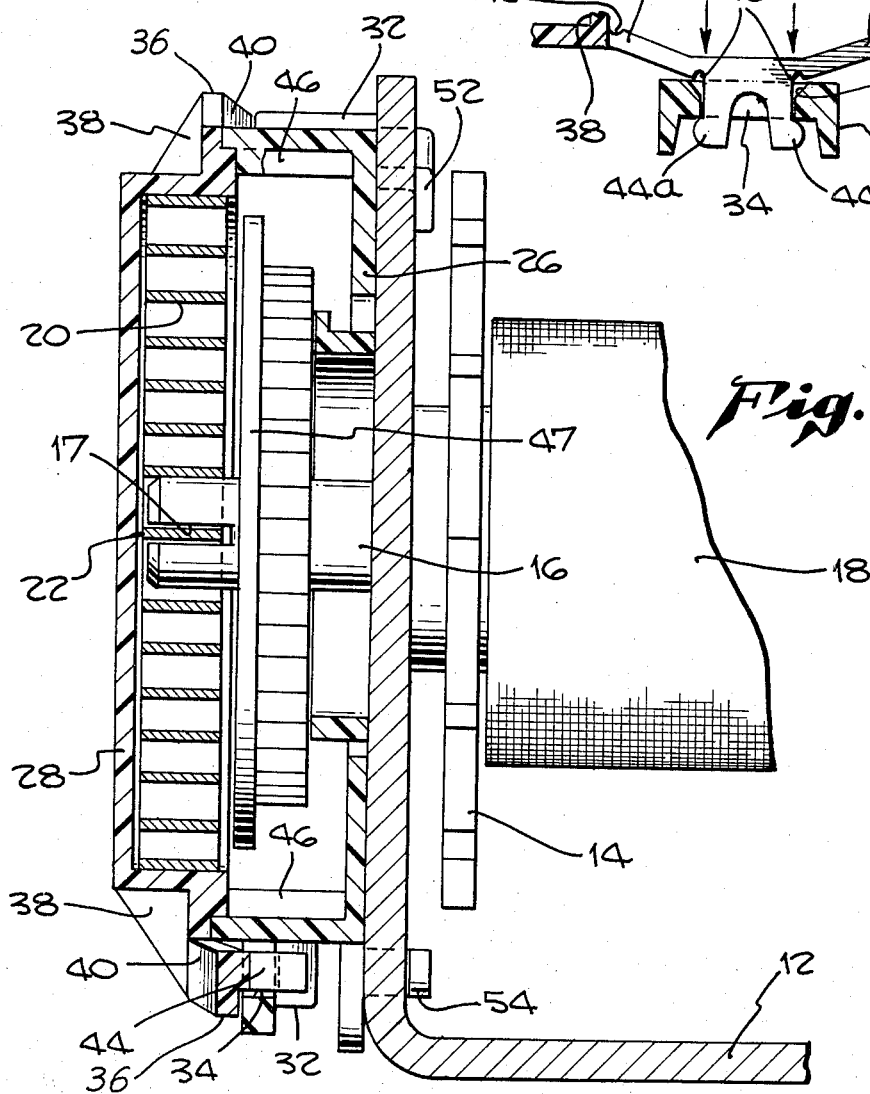

SEAT BELT RETRACTOR MECHANISM HOUSING

FIELD OF THE INVENTION

The present invention relates to seat belt retractor mechanism housings, and in particular to housings facilitating quick assembly of the retractor mechanism.

BACKGROUND OF THE INVENTION

The assembly of seat belt retractor mechanisms usually involves the attaching of the rewinding spring portion of the mechanism to a shaft extending from a seat belt storage spool through a frame onto which the spool is journaled. As the typical rewind spring is wound in a flat coil, the attachment of the spring to the shaft is usually done by placing the inner end of the spring is a slot in the shaft. The outer end of the rewind spring is attached to a housing which is usually mounted to the frame by means of snap pins or similar arrangements.

Prior to the housing being snapped to the frame, the rewind spring must be wound to exert the proper bias on the belt storage spool. In order to wind the spring, the spring housing must be rotated relative to the frame. As the snap pins, or other means by which the housing attaches to the frame, extend outwardly from the housing to the frame, the rotating of the housing to wind the spring necessitates holding the housing away from the frame during the winding process. The separation of the housing from the frame during the winding frequently results in the inner end of the spring frequently becoming disengaged from the shaft of the storage spool. The disengagement results in the rapid unwinding of the spring and the necessity for repeating the winding process.

The efficiency of the assembly of the retractor mechanism would be greatly simplified if the housing could be held directly against the frame during the winding process. As the end of the storage spool shaft normally abuts the inside wall of the housing when the housing is snapped onto the frame, the ability to hold the housing against the frame during the winding process would prevent the inner end of winding spring from disengaging the slot in the shaft extending from the storage spool.

Accordingly, it is the principal object of this invention to facilitate the quick assembly of a seat belt retractor mechanism.

It is an additional object of this invention to prevent the disengagement of the retractor mechanism spring from the belt storage spool during the assembly process.

It is a final object of this invention to improve retractor mechanism housings to simplify the assembly of the portions of the seat belt retractor mechanism in the housings.

SUMMARY OF THE INVENTION

The present invention, in a broad aspect, provides an improved retractor mechanism housing for a seat belt retractor of the type having a frame, a belt storage reel rotatably supported by the frame and adapted to wind thereon a seat belt, and a spring having an inner end and an outer end, with the inner end being connected to the belt storage reel. The housing includes a housing body and a housing cap which engages the outer end of the spring and abuts the housing body in covering relation. The housing body includes a plurality of socket members and the cap includes a plurality of positionable resilient locking flanges. The locking flanges are biased toward and formed in a position on the cap disposed away from the socket members. The positioning of the flanges allows the cap to rotate relative to the body in order to tension the spring. The flanges are deformable from their initial position to a second position which latchingly engages the socket members when sufficient tension has been applied to the spring. The latching engagement of the locking flange, along with the inherent bias in the flange, tightly affixes the housing cap to the housing body.

In accordance with one feature of the invention, each of the socket members includes a projection extending outwardly from the periphery of the housing body. The projection defines an opening having a smaller cross section in the portion of the socket member immediately adjacent the cap than in the portion of the member farthest from the cap. Each of the socket members is disposed away from the abutment of the housing body with the housing cap. In the illustrated embodiment, three of such socket members are provided and spaced in approximately equidistant relation along the outer periphery of the housing body.

In accordance with another feature of the invention, each of the locking flanges including a pair of supporting arms disposed normal to the axis of rotation of the cap and projecting outwardly from the cap. To the supporting arms are attached the ends of a resilient strut disposed along the outer periphery of the cap. Projecting toward the socket member from the resilient strut is at least one locking tab. The resilient strut is initially formed in a first position which positions the locking tab above the socket members when the housing cap is rotatably abutted to the housing body. The formation of the resilient strut in the first position results in it having a bias toward this position. When the housing cap has been sufficiently rotated to tension the spring, the resilient strut is manually deformed toward a second position which causes the locking tab to latchingly engage the socket member. The housing cap is then tightly affixed to the housing body by the latching engagement of the locking tab and the inherent bias of the resilient strut. The deformation of the resilient strut occurs within its elastic limits and is aided by serrations in the strut which weaken it to a sufficient degree to permit the required deformation.

In accordance with still another feature of the invention, the locking tab which latchingly engages the socket members can include a pair of locking fingers diverging outwardly from the resilient strut toward the socket member. The locking fingers engage opposite sides of the socket member and resist removal of the housing cap from the housing body.

In accordance with still another feature of the invention, the inner surface of the housing cap abuts the slotted end of the belt storage spool shaft, into which the inner end of the rewind spring is inserted, to prevent disengagement of the inner spring from the shaft while the housing cap is being rotated to tension the spring.

In accordance with a final feature of the invention, a quickly-assemblable housing is provided for general use. The housing contains a housing body and a housing cover. The housing body has at least one socket member disposed along its periphery. The housing cover has at least one socket insert disposed along its periphery. The insert is formed in and has a bias toward a first position and is deformable to a second position engaging the socket member and thereby affixing the cover to the body. The socket member includes a projection extending outwardly from the body. The socket insert is a deformable locking flange projected outwardly from the periphery of the housing cover by a pair of supporting arms. The locking flange is resilient and has at least one locking tab projecting toward the body. The locking tab latchingly engages the socket member when the resilient flange is deformed from its initial position toward the housing body. The latching engagement of the locking tab to the housing body, combined with the inherent bias of the resilient locking flange towards its initial position causes the housing cover to tightly engage the housing body.

Other objects, features, and advantages of the present invention will become apparent from a consideration of the following detailed description and from the accompanying drawings.

BRIEF DESCRIPTION OF THE DRAWINGS

FIG. 4 is a view of the inside of the housing cover portion of the housing shown in FIG. 1, taken along plane IV—IV, and showing the installation of the spring portion of the retractor mechanism;

FIG. 5 is a plan view of the outside of the housing cover portion of the housing shown in FIG. 1, taken along plane V—V;

FIG. 6 is a side view of the assembled retractor mechanism shown in FIG. 1;

FIG. 7 is a sectional view of the assembled housing shown in FIG. 6, taken along plane VII—VII and showing the interlocking of the housing cover to the housing body;

FIG. 8 is a detail view of the deformable resilient flange on the housing cover and the socket which it engages on the housing body;

FIG. 9 is a detail view of the initial relationship between the flange on the housing cover and the socket on the housing body, the illustrated position of the flange being that to which it has its normal bias;

FIG. 10 shows the resilient flange being deformed to a position where it engages the socket; and FIG. 11 is a cross sectional view of the assembled retractor mechanism shown in FIG. 1.

DETAILED DESCRIPTION

Figure 1:
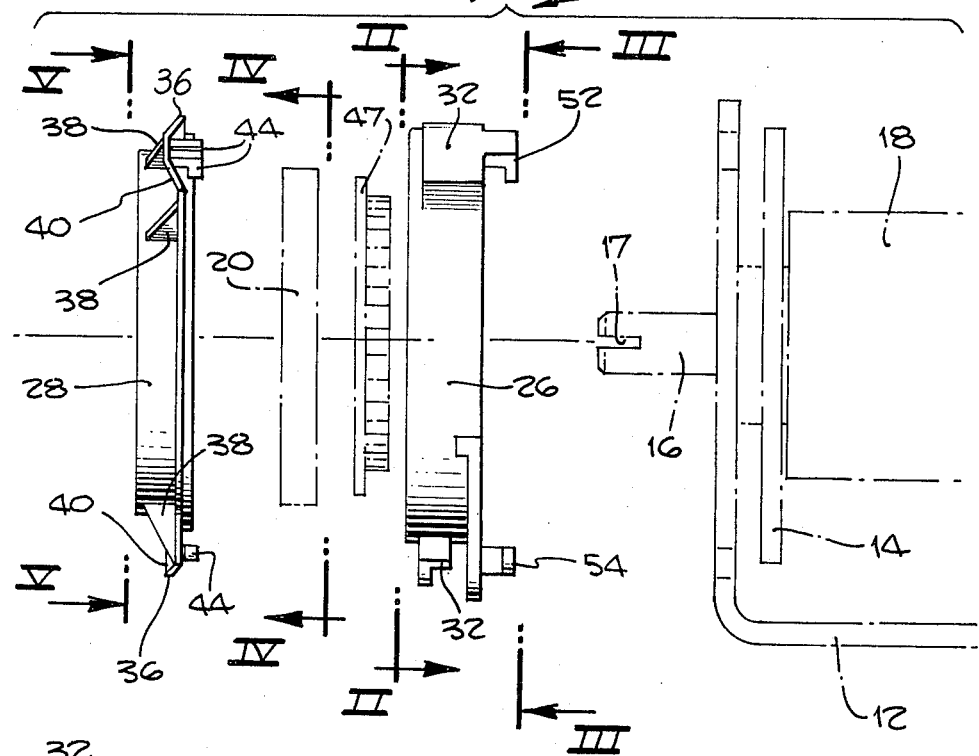
FIG. 1 is an exploded side view of a seat belt retractor mechanism housing incorporating the principles of the present invention.

Referring more particularly to the drawings, FIG. 1 shows an exploded view of a seat belt retractor implementing the principles of the present invention. The seat belt retractor, generally denoted 10, includes a frame 12, a belt storage spool 14 rotatably journaled upon the frame 12 and having a safety belt 18 wound thereon, and a retractor mechanism mounted to the frame and biasing the storage spool 18 in a direction resisting unwinding of the belt 18 from the spool 14.

Figure 2:
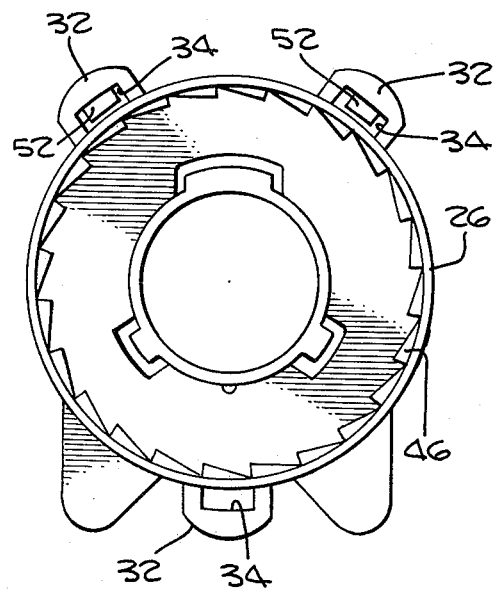
FIG. 2 is a plan view of one side of the housing body portion of the housing shown in FIG. 1, taken along plane II—II.
Figure 3:
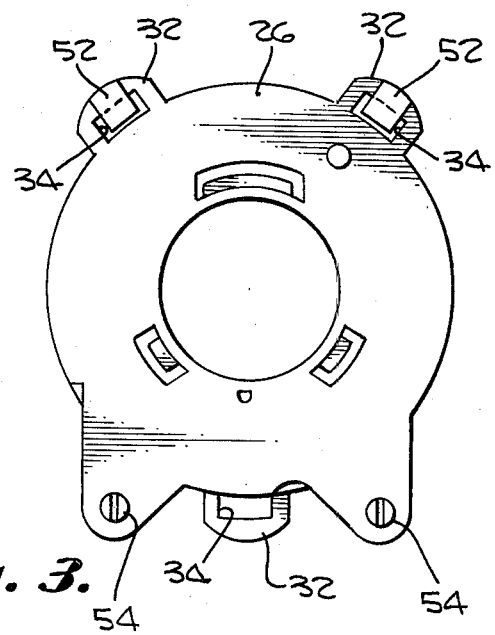
FIG. 3 is a plan view of the other side of the housing body portion of the housing shown in FIG. 1, taken along plane III—III.

The retractor mechanism, as is seen in FIG. 1, includes a housing body 26, a housing cover or cap 28, a spring means 20, and can include a rachet means 47. The retractor mechanism attaches to the frame 12 by means of fastening pins 52 and fastening tabs 54 located upon the housing body 26. As shown in FIGS. 6 and 11, the fastening pins 52 and the fastening tabs 54 on the housing body 26 lockingly engage the retractor frame 12 to affix the retractor mechanism to the frame. When the mechanism is so affixed, a shaft 16 from the belt storage spool 14 extends through an opening in the housing body 26 into the mechanism. The end of the shaft 16 has a slot 17 therein which engages the inner end 22 of the spring means 20. As shown in FIG. 4, the outer end 24 of the spring means 20 engages a slot 30 in the housing cover 28. Consequently, when the housing cover 28 is affixed to the housing body 26, the spring means 20 biases the belt storage spool 14 in a belt rewind condition. As shown in FIGS. 2 and 7, the housing body 26 may include a plurality of teeth 46 which work in conjunction with the rachet means 47 and a pawl means, which is not separately shown in the figures, to allow the retractor mechanism to be of the inertial type. The applicability of the present invention is not limited to a particular type of retractor mechanism, as the principles of the present invention may be employed with all types of retractors currently available.

As discussed, the seat belt retractor mechanism housings found in the prior art impede rapid assembly of the rewind spring into the housing. With such housings, the outer end 24 of the spring means 20 is typically affixed to a housing cover cap and the inner end 22 of the spring means 20 is then positioned in the slot 17 of the storage spool shaft 16 prior to the housing cover cap being rotated relative to a housing cover body to tension the spring during the assembly of the retractor mechanism. As mentioned, the housing covers found in the prior art generally have snap-in pins which engage the housing body. These snap-in pins usually extend below the housing cover and require the housing cover to be held away from the housing body while the initial rotation of the cover to tension the spring is occurring. The necessity of holding the housing cover away from the housing body frequently results in the inner end 22 of the spring means 20 slipping out of the slot 17 in the storage spool shaft 16. When this occurs, the inner end 22 of the spring means must be reinserted into the slot 17 and the process of attempting to tension the spring repeated. This repetition wastes valuable time in the assembly line process by which such mechanisms are manufactured.

The novel housing cover body 26 and cap 28 of the present invention obviate this problem as they allow the housing cover 28 to rotatably abut the housing body 26 during the process of tensioning the spring means 20. Consequently, the inner end 22 of the spring means 20 stays positioned within the slot 17 in the winding spool shaft 16. The rotatable abutment of the cover 28 to the body 26 during the tensioning process is possible through the provision of a plurality of sockets 32 disposed on the outer periphery of the housing body 26, and through the provision of a plurality of locking flanges 36 disposed on the outer periphery of the housing cover 28. As shown in FIGS. 2 and 5, three of such locking flanges 36 and sockets 32 are used, although different number could also be utilized and still fall within the ambit of the present invention.

Each of the socket members 32 comprises an approximately semi-circular projection from the outer periphery of the housing body 26. The projection is spaced from the surface of the housing body 26 which contacts the housing cover 28. As shown in FIGS. 8–10, each of the sockets 32 has in it an opening 34 and chamfers 55 to guide the locking pins 44 into position. The upper portion 34a of the opening 34 is smaller in cross section than the lower portion 34b of the opening 34. This feature is to allow the locking finger 44 portion of the locking flange 36 to latchingly engage the socket member 32. The opening 34 of the socket 32, as shown in the figures, is substantially rectangular. This shape is believed to be optimal for the particular configuration of the locking flange 36, although openings having other shapes would also perform satisfactorily.

The socket members 32 work in conjunction with the locking flanges 36 on the housing cover 28 to latchingly engage the flange and thereby affix the housing cover 28 to the housing body 26. The locking flanges 36 on the housing cover 28 each comprise a pair of supporting arms 38 projecting outwardly from the periphery of the housing cap 28, a resilient deformable strut member 40 suspended therebetween, and a pair of locking fingers 44 projecting toward the housing body 26 from the strut 40. All of these elements, as is the case with the housing body 26, may be formed of plastic, nylon, or any other easily-formable material.

As shown most clearly in FIG. 9, the resilient strut 40 is initially formed or molded in a position whereby no contact is made between the locking flange 36 and the socket member 32 when the housing cover 28 is abutted against the housing body 26. The resiliency of the strut 40 and its initial molding in the position shown in FIG. 9 results in it having a natural bias toward that position. Accordingly, the strut 40 "remembers" the position to an extent that it will oppose any deformation within its elastic limit and will try to return to this position.

During the assembly phase of the retractor mechanism, the outer end 24 of the spring means 20 is inserted into a slot 30 in the housing cover 28, with the inner end 22 of the spring means 20 being inserted into the slot 17 of the storage spool shaft 16. The housing cover 28 is then abutted against the housing body 26 and rotated to properly tension the spring. As shown in FIG. 11, the abutment of the housing cover 28 to the housing body 26 positions the storage spool shaft 16 extremely close to the inner surface of the housing cover 28 and thus prevents disengagement of the inner end 22 of the spring means 20 from the slot 17 at the end of the shaft 16. This provision allows quick assembly of the spring means 20 within the retractor mechanism and a prompt tensioning of the spring means 20 as the housing cover 28 is rotatably abutted to the housing body 26.

When the proper amount of tension has been placed upon the spring means 20 by the rotation of the housing cover 28 relative to the housing body 26, the housing cover 28 is further rotated so as to align the locking flanges 36 with the socket members 32. Manual force is then applied to the resilient struts 40 to deform them to an extent that the locking fingers 44 engage the sockets 32. Each of the resilient struts 40 has four serrations 42 associated with it which weaken the strut 40 to facilitate its movement from the initial position, in which the locking fingers 44 are positioned above the socket 32, to the second position in which the locking fingers 44 engage the socket member 32. The serrations 42 weaken the resilient strut 40 to a degree where it may be deformed within its elastic limit to allow engagement of the locking fingers 44 with the socket 32.

FIGS. 9 and 10 show the positions of the resilient strut 40 before and after engagement with the socket 32 has occurred. The total distance in which the resilient strut 40 moves in placing the locking fingers 44 within the socket 32 is selected to be within its elastic limit, so that the inherent bias of the strut 40 toward the position in which it was initially formed may be exerted against the upper portion of the socket 32. This inherent bias of the resilient strut 40, combined with the engagement of the locking fingers 44 in the socket 32, tightly affixes the housing cover 28 to the housing body 26. Accordingly, the spring means 20 is efficiently assembled into and retained within the retractor mechanism and properly biases the belt storage spool 14 in a belt rewind direction.

The locking fingers 44, which engage the socket 32, include a pair of arm members 44a diverging outwardly from the resilient strut 40 toward the socket member 32. Each of the arm members 44a has a rounded protrusion 44b at its lower extremity which latchingly engages the socket member 32. As discussed, the combination of the latching engagement of the locking arms 44 and the inherent bias of the resilient strut 40 toward its initial position results in the housing cover 28 being tightly affixed to the housing body 26. Additionally, it is not necessary that the resilient strut 40 utilize only two locking fingers 44 as shown in the fingers. For example, if the socket member 32 has an opening 34 which is circular instead of rectangular, a plurality of circularly-disposed locking fingers 44 could be provided on the resilient strut 40 to allow latching, positive engagement of the deformable strut 40 with the socket member 32.

As can be seen from the preceding, the engaging of the fingers 44 on deformable strut 40 with the sockets provides a unique mechanism for attaching the housing cover 28 to the housing body 26. Although illustrated in application with a seat belt retractor, the present invention is applicable to any type of housing in which a housing cover must be attached to a housing body. Accordingly, the principles of the present invention are not limited to the seat belt retractor art.

In the foregoing description of the present invention, a preferred embodiment of the invention has been disclosed. It is to be understood that other mechanical and design variations are within the scope of the present invention. Thus, by way of example and not of limitation, the socket members and corresponding locking flanges could be disposed differently on the peripheries of the housing cover and housing body; the serrations on the resilient strut 40 could be placed differently or perhaps even eliminated; the shape of the opening of the socket member could be other than rectangular; the locking fingers could be replaced by a single locking tab; the resilient strut could utilize more locking fingers than shown to engage the socket member; and the outer end of the spring means could engage the housing cover in other manners than by a slot. Accordingly, the invention is not limited to the particular arrangement which has been illustrated and described in detail herein.

What is claimed is:

1. In a safety belt retractor having a frame, a belt storage spool rotatably mounted to said frame, a safety belt connected to and having belt portions stored on said storage spool for protraction and retraction relative to said frame, and spring means including an inner end and an outer end for applying a bias on said spool in a direction resisting unwinding of said belt from said spool to a position of use, said spring means attaching by said inner end to said spool, a housing for said spring means comprising:

a housing body attached to said frame and having at least one socket member disposed on its periphery; and a housing cap including means for engaging said outer end of said spring means and being separate from and abutting said body in covering relation, said cap having at least one locking flange positioned on its periphery, said locking flange being positionable between a first position allowing said cap to rotate relative to said housing in said abutting position to tension said spring means and a second position allowing said locking flange to engage said socket means, said engagement thereby affixing said housing cap to said housing body when the desired tension has been achieved.

2. An improved housing as defined in claim 1, wherein said socket members each comprise a projection on the periphery of said body and are disposed away from said cap when said cap is in said abutment of said body, thereby allowing said cap to be rotated relative said body when each said cap locking flange is in said first position.

3. An improved housing as defined in claim 2, wherein each of said locking flanges comprise:

support means, projecting outwardly from the said periphery of said cap and disposed normal to the axis of rotation of said cap; and a resilient strut member supported at its ends by said support means, said strut member being formed in and having a bias toward said first position, and said strut member including a plurality of serrations to assist movement toward and maintenance of said second position.

4. An improved retractor mechanism housing for a seat belt retractor of the type having a frame, a winding reel rotatably supported by said frame and adapted to wind thereon a seat belt, and a spring having an inner end connected to said winding reel, said housing comprising:

means, attached to said frame, for engaging said outer end of said spring and for shielding said spring, said means including an assembly of a housing body and a separate housing cap movably abutting said body in covering relation, said cap including a plurality of positionable resilient locking flanges and said body including a plurality of socket members, said positionable flanges being initially in and having a bias toward a first position disposed away from said socket members and allowing said cap to rotate relative to said body in said abutting position to permit the tensioning of said spring, said flanges being movable to a second position latchingly engaging said socket members when sufficient tension has been applied to said spring, said latching engagement along with said bias tightly affixing said cap to said body.

5. An improved retractor mechanism housing for a safety belt retractor of the type having a frame, a safety belt storage spool having a safety belt connected thereto, said spool being mounted on said frame and urged toward a belt stored condition under a bias supplied by a spring means having an inner end to a shaft extending from said spool, said improved housing containing said spring means being mounted to said frame and comprising:

an assembly of a housing body and a separate housing body cap;

at least one socket member disposed along the periphery of said housing body;

said housing body cap abutting said body in covering relation, said cap including means for engaging said outer end of said spring; and at least one deformable socket insert means disposed along the periphery of said cap, said insert means being formed in and having a bias toward a first position allowing said cap to rotate relative to said housing body in said abutting position to permit tensioning of said spring means, and said insert means being deformable to a second position engaging said socket member and thereby affixing said cap to said housing body when the desired tension has been obtained in said spring means.

6. An improved housing as defined in claim 5, wherein said deformable insert means comprises at least one resilient locking flange and said locking flange comprises:

a pair of supporting arms disposed normal to the axis of rotation of said cap and projecting outwardly from said cap; and a resilient member disposed along the periphy of said cap and supported at its ends by said pair of support members, said resilient member being initially formed in said first position, said formation resulting in said resilient member having a bias toward said first position, and said member having a plurality of serrations facilitating said deformation into said second position.

7. In a seat belt retractor having a frame, a spool rotatably journaled on said frame, and a safety belt wound on said spool, a retraction mechanism comprising:

a housing body mounted to said frame and having an open outer end facing away from said frame;

at least one socket member disposed on the periphery of said housing body;

spring means, mounted within said housing body and having an outer spring end and an inner spring end, for biasing said spool in a belt rewind direction;

slotted shaft means, attached to said pool and extending through said frame into said housing, for attaching said inner spring end to said spool;

a housing cover and means for mounting said cover in movable and abutting relation to said housing body covering said open outer end and for engaging said outer spring end; and at least one manually operable socket insert means, located along the periphery of said cover means, for engaging said socket member, said insert means being initially in a first position not engaging said socket means, thereby allowing said spring means to be tensioned by rotating said cover relative to said housing body in said abutting position, said insert means manually movable to a second position engaging said socket means when said spring means is sufficiently tensioned and said insert means is aligned with said socket member, said engagement thereby affixing said cover to said housing body.

8. A retraction mechanism as defined in claim 7, wherein said socket insert means comprises:

a resilient flange having a range of elasticity and being deformable within said range and projecting outwardly from said cover, said flange being formed in and having a bias toward said first position, said position being disposed away from said socket member and said flange being deformable from said first position to abut said socket member in said second position; and at least one locking tab means, extending from said flange towards said socket member, for engaging said socket member, said tab means being disposed away from said socket member when said flange is in said first position, and said locking tab means latchingly engaging said socket member when said flange is in said second position, said latching engagement and said bias of said flange tightly affixing said housing cover to said housing body.

9. A retractor mechanism as defined in claim 8, wherein said socket members are disposed slightly away from the portion of said housing body immediately adjacent said cover means to facilitate clearance between said tab means and said socket members when said cover is rotated relative said body with said insert means in said first position.

* * * * *